United States Patent [19]

Hendry

[11] 4,201,742
[45] May 6, 1980

[54] METHOD AND APPARATUS FOR INJECTION MOLDING FOAMED RESIN PRODUCTS HAVING A SMOOTH FINISH ON THEIR SURFACE

[75] Inventor: James W. Hendry, Howell, Mich.

[73] Assignee: Ex-Cell-O Corporation, Troy, Mich.

[21] Appl. No.: 877,048

[22] Filed: Feb. 13, 1978

Related U.S. Application Data

[63] Continuation-in-part of Ser. No. 704,007, Jul. 9, 1976, abandoned.

[51] Int. Cl.² .......................... B29D 27/00; B29F 1/08
[52] U.S. Cl. ................................. 264/45.5; 264/102; 264/328; 264/40.6; 264/DIG. 14; 264/DIG. 65; 264/DIG. 83; 425/547; 425/552; 425/812; 425/144; 425/817 R
[58] Field of Search ....... 264/DIG. 83, 328, DIG. 65, 264/DIG. 14, 102, 45.5, 40.6; 425/144, 547, 548, 4 R, 817 R, 552, 812

[56] References Cited

U.S. PATENT DOCUMENTS

| | | | |
|---|---|---|---|
| 3,145,240 | 8/1964 | Proulx et al. | 264/DIG. 83 |
| 3,162,703 | 12/1964 | Eyles | 264/DIG. 83 |
| 3,268,635 | 8/1966 | Kraus et al. | 264/DIG. 83 |
| 3,417,173 | 12/1968 | Harrison | 425/547 |
| 3,505,435 | 4/1970 | Schmidt | 264/DIG. 83 |
| 3,671,168 | 6/1972 | Nussbaum | 264/DIG. 83 |
| 3,734,449 | 5/1973 | Itou et al. | 264/DIG. 83 |
| 3,801,244 | 4/1974 | Eisenberg | 425/122 X |
| 3,819,775 | 6/1974 | Mules | 425/144 X |
| 3,837,769 | 9/1974 | Erlenbach | 425/548 X |
| 3,988,403 | 10/1976 | Angell et al. | 264/DIG. 83 |
| 4,092,385 | 5/1978 | Balevski et al. | 264/DIG. 83 |
| 4,139,177 | 2/1979 | Hanning | 425/812 X |

FOREIGN PATENT DOCUMENTS

904518  7/1972  Canada .................................. 425/4 R

OTHER PUBLICATIONS

Weir, Clifford L. "New Foam Molding Process Offers New Product Versatility" in *Modern Plastics* Mar., 1969, pp. 68-70;72.

Throne, James L. "Gate and Vent Design for Structural Foam Molds" in *Plastics Design & Processing* Jun., 1977, pp. 31-37.

*Primary Examiner*—Philip Anderson
*Attorney, Agent, or Firm*—Frank D. Risko; James H. Bower

[57] ABSTRACT

This invention substantially improves the surface finish on resin filled foamed molded plastic products manufactured by injection molding by pre-heating the skin surface of that part of the mold in contact with the part prior to the injection cycle of the machine and then subsequently chilling the mold via internal tube connections to shorten the time needed in the manufacturing cycle for solidifying the part sufficiently for release from the mold.

15 Claims, 8 Drawing Figures

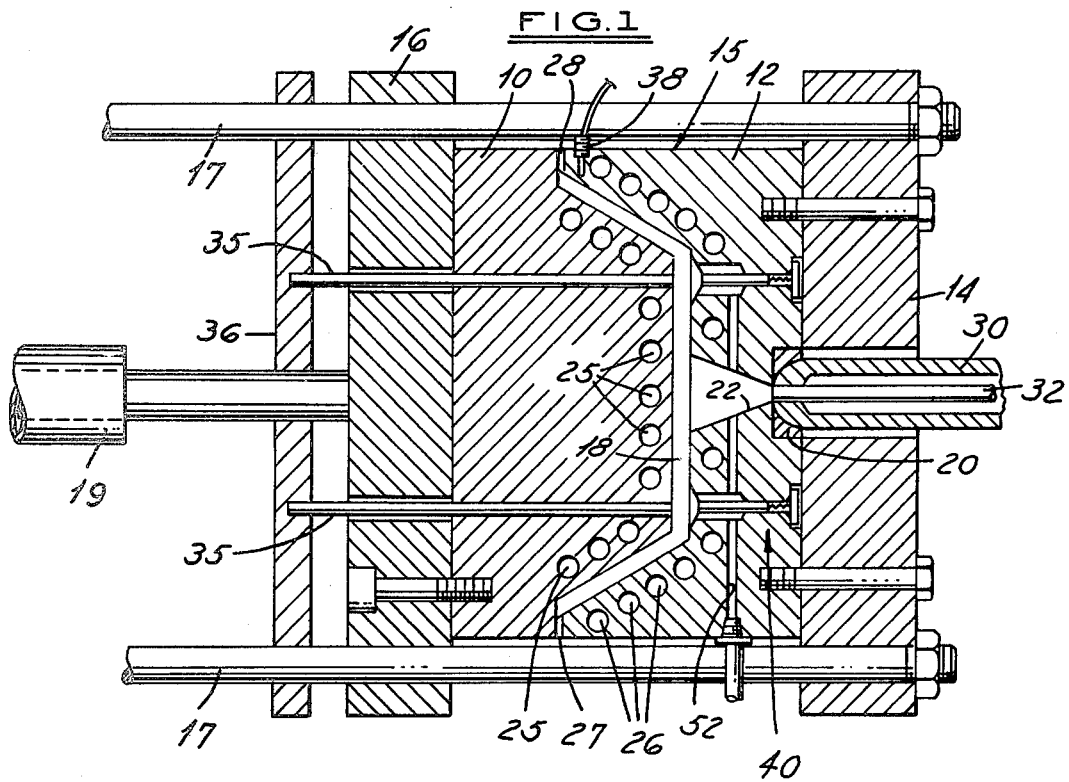
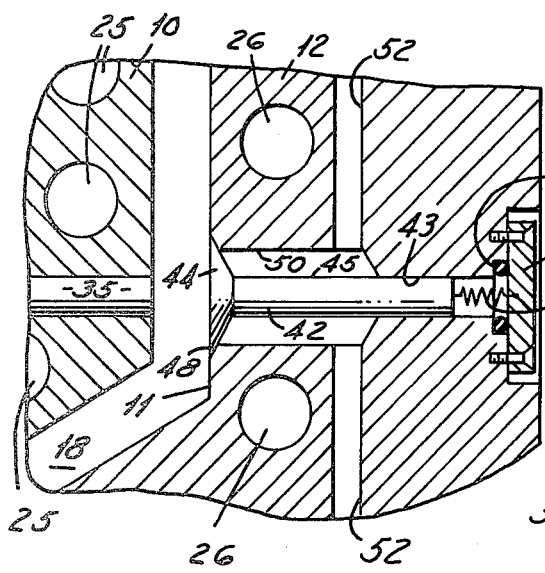
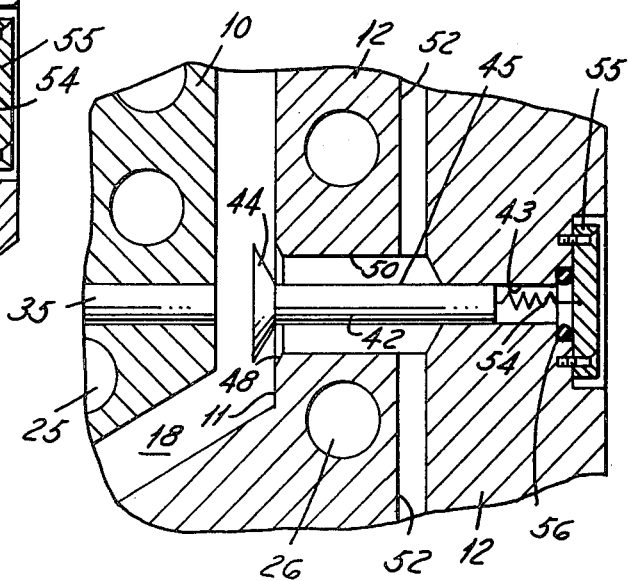
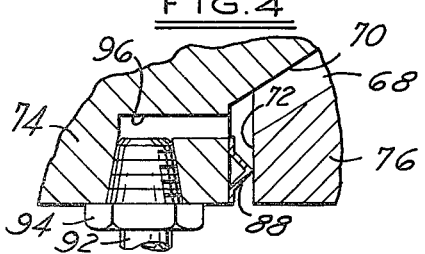

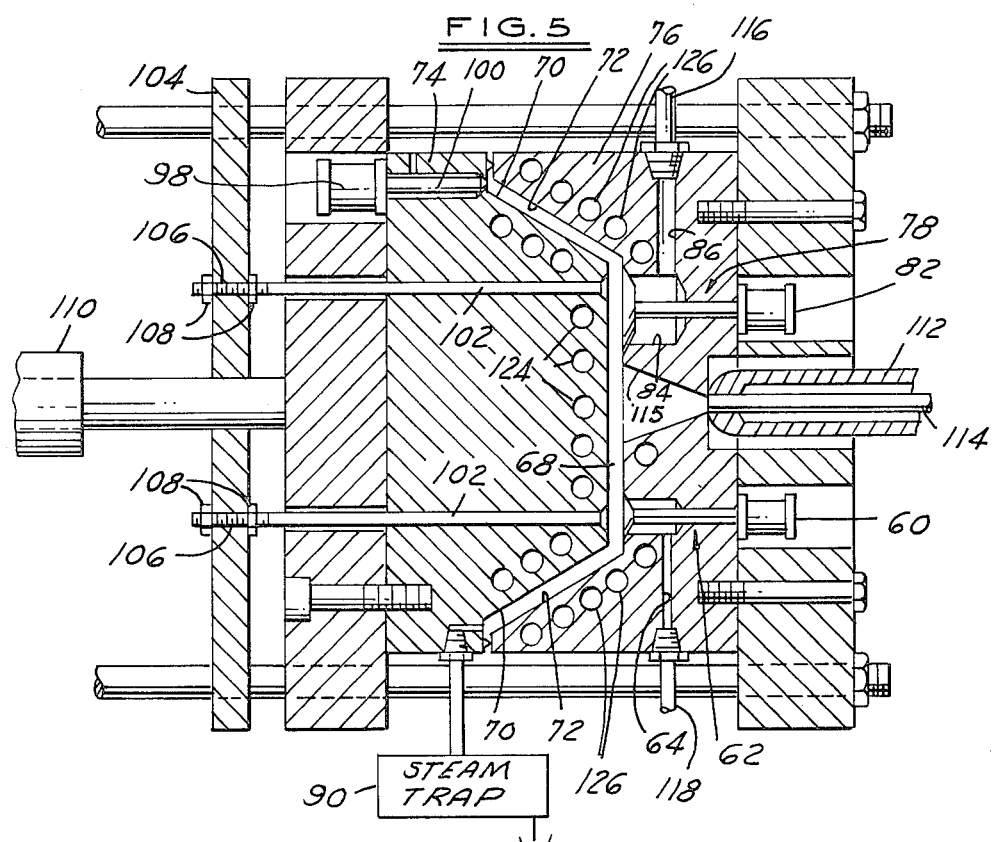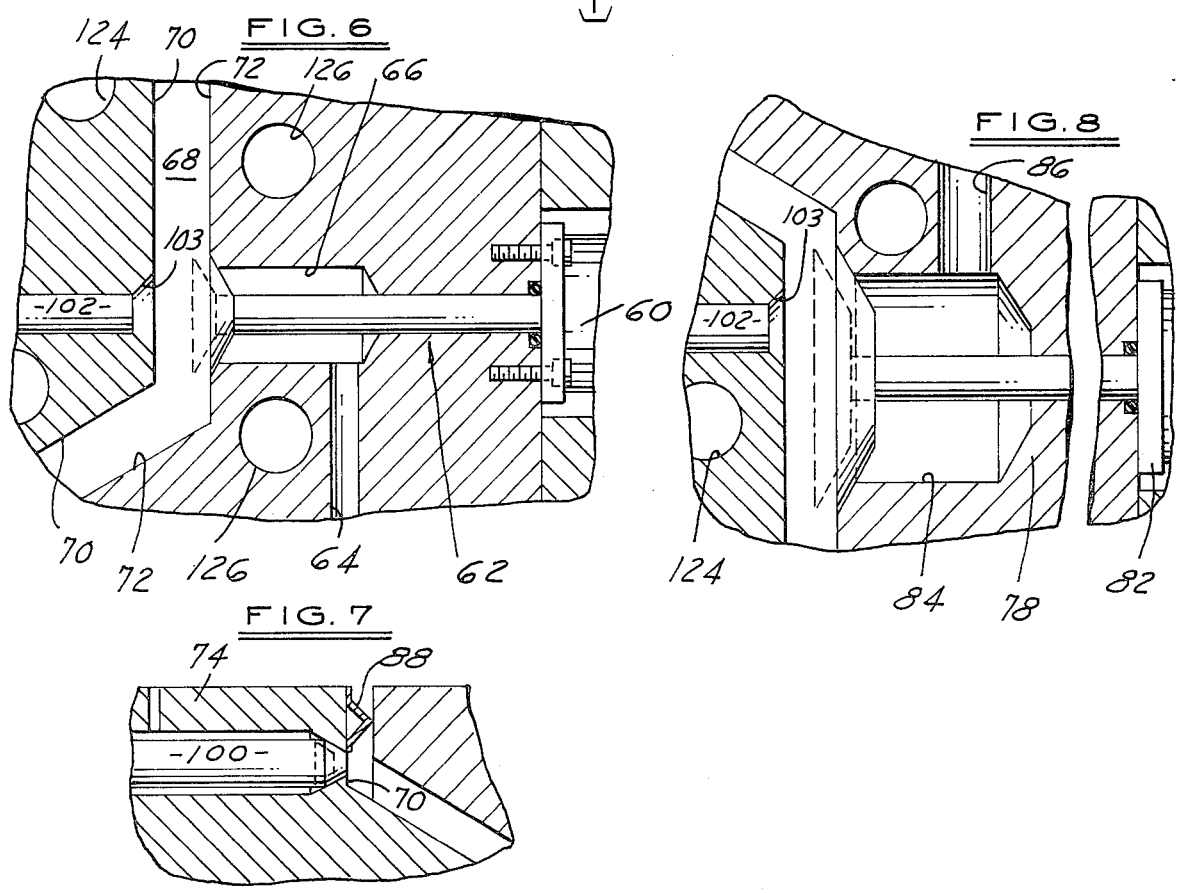

METHOD AND APPARATUS FOR INJECTION MOLDING FOAMED RESIN PRODUCTS HAVING A SMOOTH FINISH ON THEIR SURFACE

BACKGROUND OF THE INVENTION

1. Field of the Invention

This invention relates to the art of injection molding plastic products and particularly to the heating and cooling the skin of the mold cavity to achieve an improved surface finish.

2. Description of the Prior Art

In the manufacture of molded plastic parts many applications require that the part have a shiney or glossy surface when the part comes out of the mold. In the injection molding of solid parts this shiney surface is achieved. However, in the manufacture of foam molded parts, the surface finish is usually a mottled finish with swirls because the gas used or generated in the process of foam molding escapes to the surface of the part in the mold until the surface starts to solidify. As the surface solidifies, gas is trapped inside the part and the cellular inner structure develops. During the cooling cycle, while gas is still escaping to the surface, the mottled finish and swirls occur. This dull finish is objectionable because the part manufactured by this foam molding process now requires a secondary operation of finishing the parts since the mottled appearance of the original finish is not commercially acceptable.

A method of eliminating the mottled appearance is to retain the heat above the deformation temperature of the resin at the mold surfaces of the part until the cavity is full. This is a difficult and essentially an impractical approach after the part has been molded. Other methods are discussed in an article in *Plastic Technology*, Vol. 22, No. 5, May, 1976, pages 33-36, to heat up the mold itself both before and during the molding cycle. This article details lengthening the mold fill time to get a no slip flow condition at the surface of the mold during filling. Another is to increase the melt temperature to again reduce the slip/no slip condition and the third is to increase the mold temperature which causes a thin surface layer of the injected melt to retain heat which reduces the slip/no slip condition.

A process of heating the mold is described in U.S. Pat. No. 3,044,118 which heats up the whole mold above the melting temperature of the plastic, and then cools the mold down after the injection cycle using carbon dioxide gas. This method is very slow and time consuming depending on the particular part being molded and the structural sections within the part. Also the mold is subjected to extraordinary stress during this heating and cooling cycle and such stress could crack or weaken the mold which limits its useful life. Other solutions are to use low mass molds and incorporate low-mass-interior conducting surfaces, backed-up by insulators to allow the mold to be heated by the heat of the polymer. This of course requires a whole new design approach to mold making itself.

A most recent method disclosed in the process of running superheated steam through the water lines in an existing mold and then, after the injection cycle is complete, pass chilled water through the mold to cool off and solidify the part so it can be removed from the mold. The manufacturing cycle time to make the part by this method is increased from 25% to 50% over normal time in order to retard the heat loss of the resin at the mold surfaces and give the nice shiney appearance which is desired. Although giving the desired finish, the cycle time is generally considered too long for the benefit received.

An object of my invention is to heat the working surface or skin cavity of the mold with a condensing vapor by injecting the vapor directly inside the mold cavity to come in contact with the skin of the mold after it is closed and quickly evacuate it of all vapors and condensate just prior to the injection cycle. Another object of the invention is to pass cooling fluid through the interior sections of the mold to cool the surface of the part from the inside out to reduce the cycle time and produce a shiney surface.

Another object of the invention is to use poppet type valves opening directly into the mold cavity for inputting the condensing vapor for heating up the mold surface and a similar valve for evacuation of the cavity. It is further an object of this invention to heat the surface of the mold to a temperature that exceeds the heat distortion point of the material being molded.

It is a further object of this invention to seal the periphery of the cavity of the mold with a seal to act as a pressure barrier in the mold to contain the condensing vapor.

It is also an object of this invention to measure the temperature of the skin or surface of the mold cavity during both the heating and cooling cycle to determine the appropriate time to inject the plastic and the proper time to open the mold after the cooling cycle.

SUMMARY OF THE INVENTION

The method and apparatus of this invention produces a shiney surface finish on foamed plastic parts which are injection molded by first passing a high pressure saturated condensing vapor through the closed mold just prior to the injection cycle to pre-heat the cavity skin of the mold to a temperature above the heat distortion temperature of the plastic to a depth of a few thousands of an inch, and then sequentially shut off the flow of vapor, evacuate the condensate and inject the plastic resin into the mold cavity. The conventional cooling by passing a cooling fluid internally through the mold then completes the cycle.

DESCRIPTION OF THE DRAWINGS

FIG. 1 is a cross section of a mold in a closed position in a horizontal clamp of a mold machine;

FIG. 2 is a cross section of the poppet valve in an open position in the mold; and FIG. 3 is a cross section of the poppet valve in a closed position in the mold.

FIG. 4 is a cross section of the pressure barrier and outlet to the steam trap of mold configuration of FIG. 5.

FIG. 5 is a cross section of a mold in a closed position in a horizontal clamp of a mold machine.

FIG. 6 is a cross section of the inlet poppet valve of FIG. 5.

FIG. 7 is a cross section of the vent pin of the mold configuration of FIG. 5.

FIG. 8 is a cross section of the outlet poppet valve of FIG. 5.

DESCRIPTION OF PREFERRED EMBODIMENTS

In FIG. 1 is shown two mold halves 10 and 12 in a closed position which comprise a mold assembly 15 in the clamp section of an injection molding machine having a fixed plate 14 and a traveling plate 16 held in spaced relation by the bars 17 and clamp actuator 19. A nozzle 30 and shut off pin 32 are shown passing through the fixed plate 14 and in contact with sprue bushing 20. Sprue bore 22 connects the nozzle 30 with the internal cavity 19 of the closed mold assembly 15. Holes 25 and 26 in mold sections 10 and 12 respectively carry the cooling fluid during the cooling cycle of the process. Vent passages 27 and 28 are shown located on the parting line between mold half 10 and 12 and is the escape path for the condensing vapor which is passed through the mold during the operation cycle and is the vent passage for the gas used in the forming process of the plastic during its chill cycle. Although only two such vent passages 27 and 28 and shown, it is obvious that a number of these could and in general would exist around the mold.

Ejector pins 35 extend through the section 10 of the mold for ejecting the part upon completion of the cycle. These pins 35 are connected to ejector plate 36. The other elements of an injection molding machine are well known in the art and the method or apparatus for actuating same is not described or shown in detail here.

A poppet valve 40 is shown in FIG. 1 in its relation to the mold half 12. FIGS. 2 and 3 show the details of the valve in more easily seen detail. In FIG. 2 the valve plunger 42 has a rod end which slides in bore 43 and a head end 44 which is a conic shaped section which will seat in valve seat 48 which is also a conic section and mates closely with head end 44 to seal when closed. This seat 48 is a transition between the cavity side of mold surface 11 and the bore 50. Hole 52 is an inlet port for the vapors into bore 50. Diameter 45 of plunger 42 slides freely in bore 43 and is connected by a tension spring 54 to plate 55. An O-ring seal 56 or other suitable material seals the bore 43 to prevent vapor from escaping past plate 55 during the vapor cycles.

In FIG. 3 the poppet valve 40 is shown closed with the head end 44 of the valve shown flush with the surface 11 of mold section 12. It is obvious that the number of valves used and the locations of the valve 40 or valves would be in a location in the mold so as not to be objectionable in the part appearance. Minor differences in the surface of the part between the mold surface 11 and the head end 44 will occur.

A temperature probe 38 is shown in FIG. 1 located in mold section 12 which is used to measure the temperature of the cavity skin. This will measure the temperature for both the heating and cooling of the mold. The probe is a conventional thermocouple type well known in the art and is positioned to be within from 0.005 or 0.006 inches from the cavity surface or skin. Depending on the part to be molded and its size, this probe could be 0.035 inches from the skin.

The inside or cavity portion of the mold can be coated or impregnated with a thin layer of Teflon to act as a thermo-barrier to allow the heat of the plastic to be retained at the surface of the mold until the desired surface finish on the part is obtained. This will increase the time of the cooling portion of the cycle because the heat barrier will prevent the cooling fluid from cooling the part as quickly.

Another embodiment of my invention is shown in FIG. 5. Here an actuator 60, electrically or hydraulically operated, is connected to inlet poppet valve 62. The condensating vapor is allowed to enter the mold cavity through pipe 118 via hole 64 and cross bore 66 when valve 62 is opened as shown in FIG. 6 until it builds up a pressure of from 50 to 300 psig. At this pressure the surface temperature of the mold cavity 68 will achieve a temperature of from 250° to 420° F. which will be transferred to surfaces 70 and 72 of the mold halves 74 and 76. The inlet valve 62 is closed quickly and exhaust poppet valve 78 is opened by actuator 82, which is similar to actuator 60. The area of the exhaust valve opening to inlet valve opening has a ratio of 10:1 so that the pressurized vapor in the mold will literally explode out of the cavity carrying any condensate which may have remained on the surface of the cavity. This exhaust will exit via bore 84 and hole 86 which intersects this bore. Only a single exit is shown but obviously, many valves could be installed and synchronized to exhaust the vapor. Pipe 116 is of sufficient size to carry away the condensate and also could be a plurality of pipes depending on mold size. This cycle time of exhausting the cavity is in the order of 0.01 seconds which drops the pressure inside the mold to atmospheric and maintains the temperature of the cavity above the heat distortion temperature of the resin. The total cycle time of closing the inlet valve and opening and closing the exhaust valve is in the order of 0.25 seconds. A metallic crush-type seal 88 is retained in one mold half. This seal as manufactured by the Advanced Products Co. of North Haven, Connecticut can be used to seal the periphery of the mold as seen in FIGS. 4 and 7. Since a condensing vapor such as steam will cause water droplets to form on the surface of the mold, a steam trap 90 is provided at the lowest point in the mold to collect this moisture and still maintain the temperature inside the mold cavity. The trap 90 is connected to mold cavity 68 via tube 92, connector 94 and hole 96. Such a steam trap is manufactured by the Strong Co. of Fairview, Pennsylvania.

Actuator 98, either electrically or hydraulically operated controls a vent pin 100 which is shown in detail in FIG. 7 and will be open approximately 0.005 inches to let the gas and residual vapor escape from the mold during the injection step. Only one such actuator and pin are shown but is is obvious that a number of them could be placed around the edge of the part. This small size opening will allow spent gas, which would otherwise be trapped at the surface to be vented and yet will keep the plasticized resin contained within the mold. Ejector pins 102, shown best in FIGS. 6 and 8, have a flared end 103 which will seal the mold cavity 68 when pressurized with vapor since these pins are normally a slip fit in the mold half. These pins 102 are shown adjustable attached to ejector plate 104 by thread 108 and nuts 106.

OPERATION

After the mold halves 10 and 12 are closed and locked up by the clamp actuator 19 as shown in FIG. 1, a high pressure condensing vapor such as heated steam is allowed to enter passage 52. The spring 54 of the valve assembly 40 will open when the pressure built-up to the valve is 10 to 15 psi. The vapor will not flow into and through the cavity portion of the mold 15. Since the vent holes 27 and 28 are always open, the vapor will eventually find its way out of the mold. However, these vent holes 27 and 28 are very much smaller in area than the inlet and therefore a substantial amount of the vapor will be trapped inside the mold, condense on the skin of the mold and will heat it up to the temperature of the vapor. Condensate will then be purged from the mold by flushing the mold with a drying vapor. The type of plastic used for the foamed molded part will determine the temperature of the vapors and the temperature to which the skin of the cavity need be heated.

After the proper temperature is reached, the thermoprobe 38 will detect this temperature and the controls of the unit will simultaneously shut off the flow of the drying vapor, causing the valve 40 to close, and start injecting plastic through nozzle 30. It should be noted that the vapor used to purge the mold may be any of a number of gases available having inert qualities and capable of high heat transfer such as dry air, nitrogen, argon or helium. Also the vapor selected should not react with the plastic material to be used since the cavity will not necessarily be evacuated before injection of the plastic. Here the injection pressures would be substantially reduced because of the low-coefficient of friction between the injected plastic and the hot skin of the cavity.

When the injection of the plastic is complete, shut off pin 32 will seal off nozzle 30 and the cooling cycle will start with a cooling fluid forced through the cooling passages 25 and 26. The cooling fluid could be chilled water, carbon dioxide gas, Freon or some other cooling fluid. Here the velocity and quantity of cooling fluid passages will determine how quickly the part cools off. Again the temperature probe will determine the proper temperature for the cycle to be completed. The cooling passages may be connected in series or parallel fashion depending on the shape of the mold an attempt will be made to reduce this time as much as possible since it will account for 75% of the manufacturing cycle time.

As the mold 15 starts to open, the ejector pins 35 will cause the part to be pushed off the mold half and onto a conveyor or other device located near the mold to receive the part. The cooling fluid would now be reduced or stopped and the molding cycle started again.

The finished part would have a cellular inner structure with a shiney or glossy surface finish so that additional finishing of the part would not be required. The sprue 22 in the mold section 12 is shown as a large conical opening but in reality could be very small to allow a simple clean up operation for completing the part. Also, the material prior to injection would be colored the appropriate color so no additional finishing operations would be required.

Also in FIG. 1 only two valves 40 are shown opening into the mold cavity 18. Obviously more or less valves could be used depending on the size and structure of the part to be molded, and the heat necessary. If required, vacuum pumps could be attached to vent passages 27 and 28 to aid in vapor flow through the mold. Also the impregnating of the cavity skin with a thermo-barrier material could be made thinner or thicker on certain sections of the mold depending on the heat transfer properties of the plastic to be molded, the mold sections themselves, the vapors and cooling fluids.

FIG. 5 shows the preferred embodiment of my invention. After the mold halves 74 and 76 are closed and locked up by the clamp actuator 110, a high pressure and high temperature condensing vapor such as super heated steam is allowed to enter passage 64. The poppet valves 62 and 78 would be in a de-energized or closed position. The valve 62 will be opened by actuator 60 and the vapor will now flow into and throughout the mold cavity 68 heating it up. The crushable seal 88 will prevent the vapor from escaping and the pressure inside the cavity may reach 300 psig. A substantial amount of the vapor will condense on the skin of the mold and will heat it up to the temperature of the vapor. Condensate will accumulate until droplets are formed and these will purge from the mold via the steam trap 90 by the internal pressure in the mold. The type of plastic used for the foamed molded part will determine the temperature of the vapors and the temperature to which the skin of the cavity need be heated.

After the proper temperature is reached, the controls of the unit will simultaneously shut off the flow of the condensing vapor by actuator 60 causing the valve 62 to close, and open exhaust valve 78 with actuator 82. Since the relative size of the inlet valve to the exhaust valve is substantially larger and at least 1:2, any condensate which may not have been forced into the steam trap would now be blown out the exhaust valve 78. The total cycle time to purge the mold would be less than 0.25 seconds. If part size or other restrictions prevent an exhaust from being installed in the mold, the mold halves themselves could be momentarily separated to let out condensate which did not get forced into the steam trap.

Upon completion of either purge method, the controls will now start injecting plastic through nozzle 112. It should be noted that the vapor selected to heat the mold halves should not react with the plastic material. As the mold is filling, vent pin actuator 98 will be energized, as shown in FIG. 7, to vent the cavity 68 of the mold halves. The opening will be approximately 0.005 inches. Also the injection pressures would be substantially reduced because of the low-efficient of friction between the injected plastic and the hot skin of the cavity. The heated surface will keep melting the surface of the part in contact with the mold and produce the desired results.

When the injection of the plastic is complete, shut off pin 114 will seal off nozzle 112 and the cooling cycle will start with a cooling fluid forced through the cooling passages 124 and 126. The cooling fluid could be chilled water, carbon dioxide gas, Freon or some other cooling fluid. Here the velocity and quantity of cooling fluid passages will determine how quickly the part cools off. Again the size and shape of the part and type of plastic resin will determine the proper temperature and cycle time for the part to be molded. The cooling passages may be connected in series or parallel fashion depending on the shape of the part. An attempt will be made to reduce this time as much as posible since it will account for 75% of the manufacturing cycle time.

As the mold halves 74 and 76 start to open, the vent pin actuator 98 will de-energize and ejector pins 102 will cause the part to be pushed off the mold half 74 and onto a conveyor or other device located near the mold to receive the part. The cooling fluid would now be reduced or stopped and the molding cycle started again.

The finished part would have a cellular inner structure with a shiney or glossy surface finish so that additional finishing of the part would not be required. The sprue 115 in the mold section 76 is shown as a large conical opening but in reality could be very small to allow a simple clean up operation for completing the part. Also, the plastic material prior to injection could be colored the appropriate color so no additional finishing operations would be required.

Also in FIG. 5 only a single valve is shown for each inlet and exhaust valve. Also a single vent pin 100 and actuator 98 are shown. Obviously additional inlet and exhaust valves and vent pins could be used depending on the size and structure of the part to be molded, and the temperature necessary. If required, a vacuum pump could be attached to exhaust passage 86 via pipe 116 to aid in exhausting trapped condensate from the mold. Also the impregnating of the cavity skin with a thermobarrier material could be made thinner or thicker on certain sections of the mold depending on the heat transfer properties of the plastic to be molded, the mold sections themselves, the vapors and cooling fluids.

While certain embodiments and details have been shown to illustrate the invention, it will be apparent to those skilled in the art that various changes and modifications could be made therein without departing from the spirit or scope of the invention described in the appended claims.

I claim:

1. A process for injection molding a foamable thermo-plastic resin composition in a foam injection molding means having a cavity means therein comprising the steps of:
    (a) closing said mold means;
    (b) selectively flowing a condensable vapor heated above the heat distortion temperature of said resin into said mold cavity means;
    (c) selectively exhausting said vapor and condensate from said mold cavity means;
    (d) selectively venting said mold cavity means and injecting foamable thermoplastic resin into the preheated mold cavity means;
    (e) reducing temperature of said mold cavity means; and
    (f) opening said mold upon solidification of said resin and removing the solidified part.

2. The process of claim 1 wherein said condensable vapor is super heated steam.

3. The process of claim 1 or 2 wherein temperature of said cavity means is within from 250° F. to 420° F.

4. A process for injection molding a foamable thermo-plastic resin composition in a foam injection molding means having a cavity therein comprising the steps of:
    (a) closing said mold means;
    (b) selectively flowing a heated condensable vapor into said mold cavity means until said mold cavity surface is heated above the heat distortion temperature of said resin;
    (c) momentarily opening said mold means to remove residual condensate from said mold cavity means;
    (d) simultaneously venting said mold cavity means and injecting foamable resin into the preheated mold cavity means;
    (e) cooling said mold cavity means upon completion of said injection step by the flowing of cooling fluid to said mold; and
    (f) opening said mold means upon solidification of said resin, removing the solidified part and reducing the flow of said cooling fluid.

5. The process of claim 4 wherein said condensable vapor is super heated steam.

6. Apparatus for injection foam molding a thermoplastic resin comprising an injection mold means having two mold halves and a cavity means therein, a nozzle means communicating with the sprue opening of said mold means, and cooling passages internal to said mold means wherein the improvement comprises valve means communicating said cavity means in said injection mold means to selectively connect a heated source of condensable vapor directly to said cavity means, means to exhaust said mold cavity means to atmosphere and a seal means peripherally located between said mold halves.

7. The apparatus of claim 1 wherein means connecting said mold cavity means to atmosphere is an exhaust valve means and a passage means.

8. The apparatus of claim 7 wherein a vent valve means is selectively operated to vent said cavity means subsequent to operation of said exhaust valve means.

9. The apparatus of claim 6 wherein the temperature of said mold cavity means is heated from 250° F. to 420° F. by said condensable vapor and at a pressure of from 50 to 300 psig.

10. The apparatus of claim 8 wherein the temperature of said mold cavity means is heated within from 250° F. to 420° F. by said condensable vapor and at a pressure of from 50 to 300 psig.

11. Apparatus for injection foam molding thermoplastic resin into an injection foam molding means having two mold halves affixedly held in a horizontal press with a nozzle means communicating with the sprue opening of one mold half, cavity means internal to said mold means, and cooling passages internal to said molding means wherein the improvement comprises a plurality of valve means communicating with said cavity means in said injection molding means selectively operated for communication with said molding cavity means connecting a heated source of condensable vapor directly to said cavity means, a plurality of exhaust valve means selectively operated for communication of said mold cavity via passage means to atmosphere and a seal means peripherally located between said mold halves.

12. The apparatus of claim 7 or 11 wherein a steam trap is connected to said passage means.

13. The apparatus of claim 12 wherein a vent valve means is selectively operated to vent said cavity means subsequent to operation of said exhaust valve means.

14. The apparatus of claim 11 wherein the temperature of said mold cavity means is heated from 250° F. to 350° F. by said condensable vapor and at a pressure of from 50 to 200 psig.

15. The apparatus of claim 13 wherein the temperature of said mold cavity means is heated within from 250° F. to 350° F. by said condensable vapor and at a pressure of from 50 to 200 psig.

* * * * *